US007146013B1

(12) United States Patent
Saito et al.

(10) Patent No.: US 7,146,013 B1
(45) Date of Patent: Dec. 5, 2006

(54) MICROPHONE SYSTEM

(75) Inventors: Nozomu Saito, Iwaki (JP); Shingo Kiuchi, Iwaki (JP); Koichi Nakata, Iwaki (JP)

(73) Assignee: Alpine Electronics, Inc., Tokyo (JP)

(*) Notice: Subject to any disclaimer, the term of this patent is extended or adjusted under 35 U.S.C. 154(b) by 0 days.

(21) Appl. No.: 09/551,273

(22) Filed: Apr. 18, 2000

(30) Foreign Application Priority Data

Apr. 28, 1999 (JP) ................................ 11-121517
Apr. 28, 1999 (JP) ................................ 11-121518

(51) Int. Cl.
*G06F 155/00* (2006.01)

(52) U.S. Cl. ........................................................ 381/92

(58) Field of Classification Search ................ 381/122, 381/86, 94.7, 91–92, 369, 71.11–71.12; 704/226–228, 704/233; 708/322
See application file for complete search history.

(56) References Cited

U.S. PATENT DOCUMENTS

| | | | | |
|---|---|---|---|---|
| 4,658,426 | A * | 4/1987 | Chabries et al. | 381/94.3 |
| 5,208,864 | A * | 5/1993 | Kaneda | 704/258 |
| 5,303,307 | A * | 4/1994 | Elko et al. | 381/92 |
| 5,402,496 | A | 3/1995 | Soli et al. | |
| 5,442,813 | A * | 8/1995 | Walters | 455/89 |
| 5,471,538 | A * | 11/1995 | Sasaki et al. | 381/92 |
| 5,473,702 | A * | 12/1995 | Yoshida et al. | 381/94 |
| 5,675,655 | A * | 10/1997 | Hatae | 381/26 |
| 5,754,665 | A * | 5/1998 | Hosoi | 381/94.1 |
| 5,796,819 | A * | 8/1998 | Romesburg | 379/406 |
| 6,061,456 | A * | 5/2000 | Andrea et al. | 381/71.6 |
| 6,430,295 | B1 * | 8/2002 | Handel et al. | 381/94.7 |
| 6,760,449 | B1 * | 7/2004 | Matsuo | 381/92 |
| 6,999,541 | B1 * | 2/2006 | Hui | 375/350 |

FOREIGN PATENT DOCUMENTS

| | | | | |
|---|---|---|---|---|
| DE | 457176 | * | 8/1991 | 381/86 |
| JP | 61028294 | * | 2/1986 | |
| JP | 08-040070 | * | 2/1996 | |

* cited by examiner

*Primary Examiner*—Vivian Chin
*Assistant Examiner*—Lun-See Lao
(74) *Attorney, Agent, or Firm*—Brinks Hofer Gilson & Lione

(57) ABSTRACT

The microphone system of the invention executes an adaptive filter processing by using output signals from two microphones to output a speaker's voice signal with an improved SN ratio, in which the two microphones are laid out close to each other, and the angles formed by the orientations of the microphones with respect to the speaker's vocalizing direction are made different for each of the microphones. For example, the microphones are mounted on the sun visor of a vehicle, or on the ceiling above the front passenger seat or the driver's seat of the vehicle, with the orientations of the microphones differentiated. Further, the SN ratio of the output signal from one microphone is raised, and the SN ratio of the output signal from the other microphone is lowered. For example, one microphone is positioned right above a speaker's face, and the other microphone is spaced apart on the occipital side by about 1 to 5 cm from the position of the first microphone. Thus, the microphone system improves the SN ratio of the voice signal.

20 Claims, 15 Drawing Sheets

MICROPHONE SYSTEM OF THE INVENTION

MICROPHONE SYSTEM OF THE INVENTION

ILLUSTRATION DIRECTIONAL CHARACTERISTICS

ILLUSTRATION MICROPHONE LAYOUT

CASE : MOUNTING MICROPHONE ON THE SUN VISOR

CASE : MOUNTING MICROPHONE ON THE CEILING ABOVE THE DRIVER'S ASSISTANT SEAT

TABLE : SN IMPROVEMENT RATE WHEN VARYING THE ORIENTATION OF THE MICROPHONE ON THE RIGHT SIDE MOUNTED ON THE SUN VISOR

FIG. 4(a)

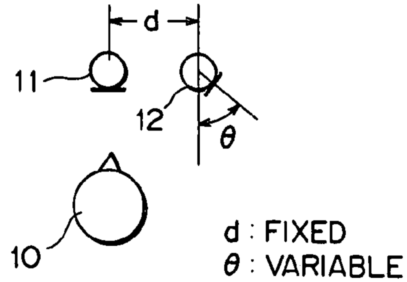

FIG. 4(b)

| CONDITION | | HACHINOHE (BEFOR NR) | HACHINOHE (AFTER NR) | KESENNUMA (BEFOR NR) | KESENNUMA (AFTER NR) | YUKUHASHI (BEFOR NR) | YUKUHASHI (AFTER NR) | SAPPORO (BEFOR NR) | SAPPORO (AFTER NR) | KITAMI (BEFOR NR) | KITAMI (AFTER NR) | AVERAGE IMPROVEMENT RATE |
|---|---|---|---|---|---|---|---|---|---|---|---|---|
| SUN VISOR | Ps | -11.3 | -12.0 | -14.2 | -14.7 | -15.2 | -15.9 | -10.6 | -10.3 | -11.5 | -11.9 | NR RATE : 5.83 |
| | Pn | -17.0 | -21.7 | -17.0 | -21.7 | -17.0 | -21.7 | -17.0 | -21.7 | -17.0 | -21.7 | O |
| θ = 45° | SNR | 5.6 | 9.7 | 2.7 | 7.0 | 1.7 | 5.8 | 6.3 | 11.4 | 5.4 | 9.8 | |
| | IMPROVEMENT RATE | | 4.1 | | 4.2 | | 4.1 | | 5.1 | | 4.3 | 4.3 |

TABLE : SN IMPROVEMENT RATE WHEN MOVING THE MICROPHONE ON THE RIGHT SIDE MOUNTED ON THE SUN VISOR WITH THE ANGLE OF 60°

θ = 60° : FIXED
d : VARIABLE

BEFOR NR AFTER NR

| CONDITION | | HACHINOHE | | KESENNUMA | | YUKUHASHI | | SAPPORO | | KITAMI | | AVERAGE IMPROVEMENT RATE |
|---|---|---|---|---|---|---|---|---|---|---|---|---|
| SUN VISOR d = 9cm θ = 60° | Ps<br>Pn | -14.6<br>-17.6 | -13.6<br>-20.0 | -13.5<br>-17.6 | -11.6<br>-20.0 | -15.6<br>-17.6 | -13.7<br>-20.0 | -12.3<br>-17.6 | -9.5<br>-20.0 | -10.3<br>-17.6 | -6.7<br>-20.0 | NR RATE : 4.51<br>O |
| | SNR | 3.0 | 6.4 | 4.1 | 8.4 | 2.0 | 6.3 | 5.3 | 10.5 | 7.3 | 13.3 | |
| | IMPROVEMENT RATE | | 3.5 | | 4.3 | | 4.4 | | 5.2 | | 6.0 | 4.7 |

TABLE : SN IMPROVEMENT RATE WHEN MOUNTING THE MICROPHONES ON THE CEILING ABOVE THE DRIVER'S ASSISTANT SEAT PERPENDICULARY TO THE SPEAKER'S VOCALIZING DIRECTION, AND MOVING ONE ON THEM

FIG. 6(a)

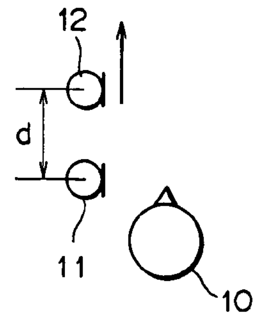

FIG. 6(b)

| CONDITION | | HACHINOHE | | KESENNUMA | | YUKUHASHI | | SAPPORO | | KITAMI | | AVERAGE IMPROVEMENT RATE |
|---|---|---|---|---|---|---|---|---|---|---|---|---|
| CEILING ABOVE THE DRIVER'S ASSISTANT SEAT d = 7.5cm | Ps<br>Pn | -12.2<br>-12.8 | -16.1<br>-20.8 | -12.6<br>-12.8 | -17.1<br>-20.8 | -13.5<br>-12.8 | -17.1<br>-20.8 | -12.3<br>-12.8 | -15.0<br>-20.8 | -8.8<br>-12.8 | -11.1<br>-20.8 | NR RATE : 3.90<br>○ |
| | SNR | 0.7 | 4.6 | 0.2 | 3.7 | 0.6 | 3.6 | 0.6 | 5.8 | 4.0 | 9.6 | |
| | IMPROVEMENT RATE | | 4.0 | | 3.6 | | 4.3 | | 5.2 | | 5.6 | 4.5 |

TABLE : SN IMPROVEMENT RATE WHEN MOUNTING THE MICROPHONES FORWARD ON THE CEILING ABOVE THE DRIVER'S ASSISTANT SEAT AND VARYING THE DISTANCE BETWEEN THEM

FIG. 7(a)

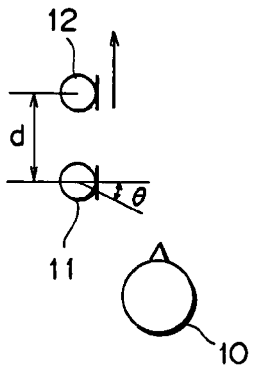

θ : FIXED
d : VARIABLE

FIG. 7(b)

BEFORE NR AFTER NR

| CONDITION | | HACHINOHE | | KESENNUMA | | YUKUHASHI | | SAPPORO | | KITAMI | | AVARAGE IMPROVEMENT RATE |
|---|---|---|---|---|---|---|---|---|---|---|---|---|
| CEILING ABOVE THE DRIVER'S ASSISTANT SEAT d = 2cm | Ps<br>Pn | -14.3<br>-20.2 | -14.0<br>-24.7 | -13.0<br>-20.2 | -13.7<br>-24.7 | -15.9<br>-20.2 | -15.5<br>-24.7 | -11.2<br>-20.2 | -11.7<br>-24.7 | -10.4<br>-20.2 | -11.0<br>-24.7 | NR RATE : 5.77<br>O |
| | SNR | 6.0 | 10.7 | 6.5 | 11.0 | 4.7 | 9.2 | 8.5 | 13.0 | 9.3 | 13.8 | |
| | IMPROVEMENT RATE | | 4.7 | | 4.5 | | 4.5 | | 4.5 | | 4.5 | 4.5 |

ANOTHER CONFIGURATION OF MICROPHONE SYSTEM

CONFIGURATION OF THE MICROPHONE SYSTEM OF THE INVENTION

VOICE EMISSION CHARACTERISTICS OF A HUMAN BEING

A = 125 ~ 250Hz
B = 500 ~ 700Hz
C = 1,400 ~ 2,000Hz
D = 4,000 ~ 5,000Hz

CHART EXPLANATION OF POSITIONS OF THE PAIRED MICROPHONES

RELATION BETWEEN THE POSITIONS OF THE PAIRED MICROPHONES AND THE SN IMPROVEMENT RATE

CHART : EXPLANATION OF DISTANCE BETWEEN THE PAIRED MICROPHONES

RELATION BETWEEN THE DISTANCE BETWEEN THE PAIRED MICROPHONES AND THE SN IMPROVEMENT RATE

SN IMPROVEMENT RATE BY EACH VOCALIZER

RELATION BETWEEN SN RATIO AND RECOGNITION RATE

CONVENTIONAL HIGH SN RATIO SOUND RECEPTION SYSTEM USING TWO MICROPHONES

CHARACTERSTICS OF TARGET RESPONSE SETTER

FREQUENCY CHARACTERISTICS

IMPULSE RESPONSE CHARACTERISTICS

MICROPHONE SYSTEM

BACKGROUND OF THE INVENTION

1. Field of the Invention

The present invention relates to a microphone system that executes an adaptive signal processing by using signals outputted from two microphones and outputs a speaker's voice signal with the signal to noise ratio improved.

2. Related Art

The technological development of voice recognition systems at present has evolved to such a level that a recognition rate of about 95% can be achieved in an environment that the SN (signal to noise) ratio of more than 15 dB is obtained. However, the conventional voice recognition system has the property that as the SN ratio is lowered by the surrounding noises, the recognition rate sharply decreases. FIG. 16 illustrates the relationship between the SN ratio and the recognition capability of some types of microphones (omnidirectional, unidirectional, narrow-directional, AMNOR (Adaptive Microphone-array for Noise Reduction)), in which the relationship between the SN ratio and the recognition rate stays in a zone almost shaped as an S-letter curve 100. As clearly seen in this drawing, the recognition rate sharply decreases as the SN ratio decreases, and it reaches about 50% in an environment where the SN ratio is 0 dB.

Accordingly, inside a car's passenger compartment filled with various noises (engine noise, road noise, pattern noise, whistling noise, etc.) that a running car creates, the deterioration of the foregoing recognition capability is unavoidable. This is a significant problem when incorporating a voice recognition system in a car.

In view of these circumstances, various systems have been proposed which reduce the influence by the surrounding noises on receiving the voice with a high SN ratio, in which can be quoted the high SN ratio voice reception system using plural microphones and digital signal processing as an example. The most simple configuration of such a high SN ratio voice reception system is illustrated in FIG. 17, which uses two microphones. Additionally, there are proposed highly advanced systems, such as the Griffith-Jim type array or the AMNOR.

In FIG. 17, 1 denotes a first microphone, 2 a second microphone, and 3 an adaptive signal processor which receives an error signal e and an output signal $x_2$ from the microphone 2 as the reference signal, and executes the adaptive signal processing on the basis of the LMS (Least Mean Square) algorithm so as to minimize the power of the error signal e. In the adaptive signal processor 3, 3*a* signifies an LMS calculator, 3*b* an adaptive filter with a configuration of the FIR type digital filter, for example. The LMS calculator 3*a* determines the coefficients of the adaptive filter 3*b* so as to minimize the power of the error signal e through the adaptive signal processing.

4 signifies a target response setter that receives a signal outputted from the microphone 1 as the target signal to satisfy the causality. When the signal delay time of half the tap length of the adaptive filter 3*b* is given by d, the target response setter 4 has a delay characteristic of the time d, and flat characteristic (characteristics of the gain 1) in the audio frequency band. That is, the target response setter 4 is provided with the flat frequency response characteristics of the gain 1 as shown in FIG. 18(*a*), and the impulse response characteristics having the delay time d as shown in FIG. 18(*b*).

Returning to FIG. 17, 5 signifies a subtracter that subtracts an output signal from the adaptive filter 3*b* from a target response outputted from the target response setter 4, and outputs the error signal e.

During the non-recognition of a voice, the microphones 1, 2 receive only noises, and the adaptive signal processor 3 determines the filter coefficient W so as to minimize the power, namely, the noise output of the error signal e. On the other hand, during the recognition of a voice, the adaptive signal processor 3 does not update the filter coefficient, and sets the filter coefficient W determined during the non-recognition of a voice to the adaptive filter 3*b* to output a voice signal.

The ideal characteristic desired for the system shown in FIG. 17 is to output only a voice signal Xs(z) (zero noise output) during the recognition of a voice. In other words, with regard to a noise output En(z), when giving the following expression:

$$En(z)=Xn_1(z)z^{-d}-Xn_2(z)\cdot W(z) \tag{1}$$

by determining the adjustable parameters (coefficient W of the adaptive filter 3*b*) so as to minimize the power of the error signal e, to realize the following expression (2) is the ideal condition to obtain.

$$Es(z)=Xs_1(z)z^{-d}-Xs_2(z)W(z)\approx Xs(z) \tag{2}$$

Here, $Xn_1(z)$, $Xn_2(z)$ are the noises contained in the output signals from the microphones 1, 2, and given that the propagation characteristics from a noise source (noise=xn) to the first and second microphones 1, 2 are CN1, CN2, $Xn_1(z)=CN1\cdot xn$ $Xn_2(z)=CN2\cdot xn$ expression (1) is reduced to the following.

$$En(z)=(CN1\cdot z^{-d}-CN2\cdot W(z))xn \tag{1'}$$

Further, $Xs_1(z)$, $Xs_2(z)$ are the voice signals contained in the output signals from the microphones 1, 2, and given that the propagation characteristics from the mouth of a speaker (speaker's voice=xs) to the first and second microphones 1, 2 are CS1, CS2, $Xs_1(z)=CS1\cdot xs$ $Xs_2(z)=CS2\cdot xs$ expression (2) is reduced to the following.

$$Es(z)=(CS1\cdot z^{-d}-CS2\cdot W(z))xs \tag{2'}$$

Here, considering the actual conditions in a car passenger compartment, there are many noise sources and the coherence of the noises in the car that the microphones 1, 2 pick up is inclined to decrease, as the distance between the microphones 1, 2 is set larger. Accordingly, as the two microphones 1, 2 are moved further apart, the noise output expressed by the equation (1) becomes greater, so that the microphones 1, 2 need to be laid out as close together as possible.

However, if they are laid out as close together as possible, the two microphones 1, 2 will likely receive the voice and noise having virtually the same level and components. If the noise is eliminated by the adaptive filter coefficient W determined in the optimum condition to remove the noise, even the voice will be eliminated. However, if the adaptive filter coefficient W is determined so as to satisfy the expression (2), the voice will not be damaged, but on the other hand, the noise will hardly be eliminated either and the SN ratio will hardly be improved, which is a problem to be solved.

Thus, in pursuit of achieving the maximum suppression of the noises, it is desirable to lay out the two microphones adjacently. On the other hand, in order to minimize the suppression of the voice, it is desirable that the two microphones are separated far from each other. Both of the two conditions cannot be satisfied at the same time. Therefore, in the conventional microphone system, the SN ratio of the voice signal cannot be improved significantly, which is disadvantageous.

SUMMARY OF THE INVENTION

Therefore, it is an object of the invention to provide a microphone system (noise reduction system) using two microphones that improves the SN ratio of the voice signal.

According to one aspect of the invention to accomplish the object, the microphone system executes an adaptive signal processing by using output signals from two microphones and outputs a speaker's voice signal with an improved SN ratio, in which the two microphones having directional characteristics are laid out close to each other, and the angles formed by the orientations of the microphones and a speaker's vocalizing direction are made different for each of the microphones.

With this configuration, in spite of the close layout of the two microphones, one microphone can pick up the speaker's voice with a high SN ratio, and the other microphone can pick up the speakers voice with a low SN ratio. On the other hand, since the close layout of the microphones restricts the decrease of the coherence between the noises outputted from the two microphones, the correlation between the reception noises by the microphones can be increased, and the difference between the reception sensitivities to a voice by the microphones can be enlarged, thereby improving the SN ratio of the voice signal.

As an example of the microphone layout, the two microphones are mounted adjacently on the sun visor, or on the ceiling above the driver's assistant seat (i.e., front passenger seat) or the driver's seat of a vehicle, with the angles formed by the orientations of the microphones and the speaker's vocalizing direction made different.

Further, according to another aspect of the invention, the microphone system executes the adaptive signal processing by using the output signals from the two microphones and outputs the speaker's voice signal with an improved SN ratio, in which the microphones are laid out adjacently, and the SN ratio of the output signal from one microphone is raised, and the SN ratio of the output signal from the other microphone is decreased.

With this configuration, the noises $Xn_1(z)$, $Xn_2(z)$ contained in the output signals of the two microphones can be made almost equal. On the other hand, the voice signals $Xs_1(z)$, $Xs_2(z)$ contained in the output signals of the two microphones can be differentiated. Therefore, when the adaptive filter coefficients are determined to minimize the root mean square of En(z) during the noise signal input, the voice output Es(z) given by the expression (2) does not become zero, thus improving the SN ratio of the voice signal.

As an example of the microphone layout, one microphone is disposed right above a speaker's face, and the other microphone is spaced apart on the occipital side by about 1 to 5 cm from the position of the first microphone. With this configuration, in spite of the adjacent positioning of the two microphones, one microphone can pick up the speaker's voice with as high an SN ratio as possible, and the other microphone can pick up the speaker's voice with as low an SN ratio as possible.

BRIEF DESCRIPTION OF THE DRAWINGS

FIG. 4 is a table explaining the SN ratio improvement rate, when varying the angle θ formed by the orientation of the microphone on the right side mounted on the sun visor and the speaker's vocalizing direction;

FIG. 6 is a table explaining the SN ratio improvement rate, when mounting the microphones on the ceiling above the front passenger seat such that the orientation of the microphones is perpendicular to the speaker's vocalizing direction, and moving one of them to vary the distance between them;

FIG. 7 is a table explaining the SN ratio improvement rate, when mounting the microphones forward on the ceiling above the front passenger seat and varying the distance between them;

DETAILED DESCRIPTION OF THE PREFERRED EMBODIMENTS

Principle of the Invention

In a noise reduction system using two microphones, it is ideal to intensify the correlation between the reception noises of the microphones, and in addition to increase the difference between the reception sensitivities to a voice of the microphones. However, there is a trade-off between "the correlation between the reception noises" and "the difference between the reception sensitivities to a voice" of the two microphones, and to satisfy the one by adjusting the distance will not satisfy the other accordingly. For example, as the two microphones are moved closer, the correlation between the reception noises is increased but at the same time, the difference between the reception sensitivities to a voice is also diminished, resulting in receiving the voice equally. Therefore, if the adaptive signal processing is executed, the noise will be suppressed, but the voice will also be suppressed at the same time, and consequently the improvement of the SN ratio cannot be expected.

In the present invention, two microphones having directional characteristics are laid out adjacently, and the angles formed by the orientations of the microphones with respect to the speaker's vocalizing direction are different for each microphone. With the microphones positioned in this manner, although the two microphones are laid out adjacently, the configuration of the two can be set such that one microphone picks up the speaker's voice with a high SN ratio, and the other one picks up the speaker's voice with a low SN ratio. Accordingly, the close placement of the two microphones enhances the correlation between the reception noises as well as increases the difference between the reception sensitivities of the two microphones to a voice, which improves the SN ratio of the voice signal.

Further, in this invention, the relatively adjacent layout of the microphones 11, 12 restricts the decrease of the coherence between the noises outputted from the two microphones. Also, in consideration of the voice emission characteristics of a human being, in spite of the relatively adjacent layout of the microphones 11, 12, one microphone 11 picks up the voice with as high an SN ratio as possible, and the other microphone 12 picks up the voice with as low an SN ratio as possible. As the result, if the adaptive filter coefficient W is determined so as to zero the noise output, the voice output will not be diminished in the same manner as the noise output, whereby the SN ratio of the voice signal can be improved.

1. First Embodiment

(a) Configuration of the Microphone System

Figure 1:
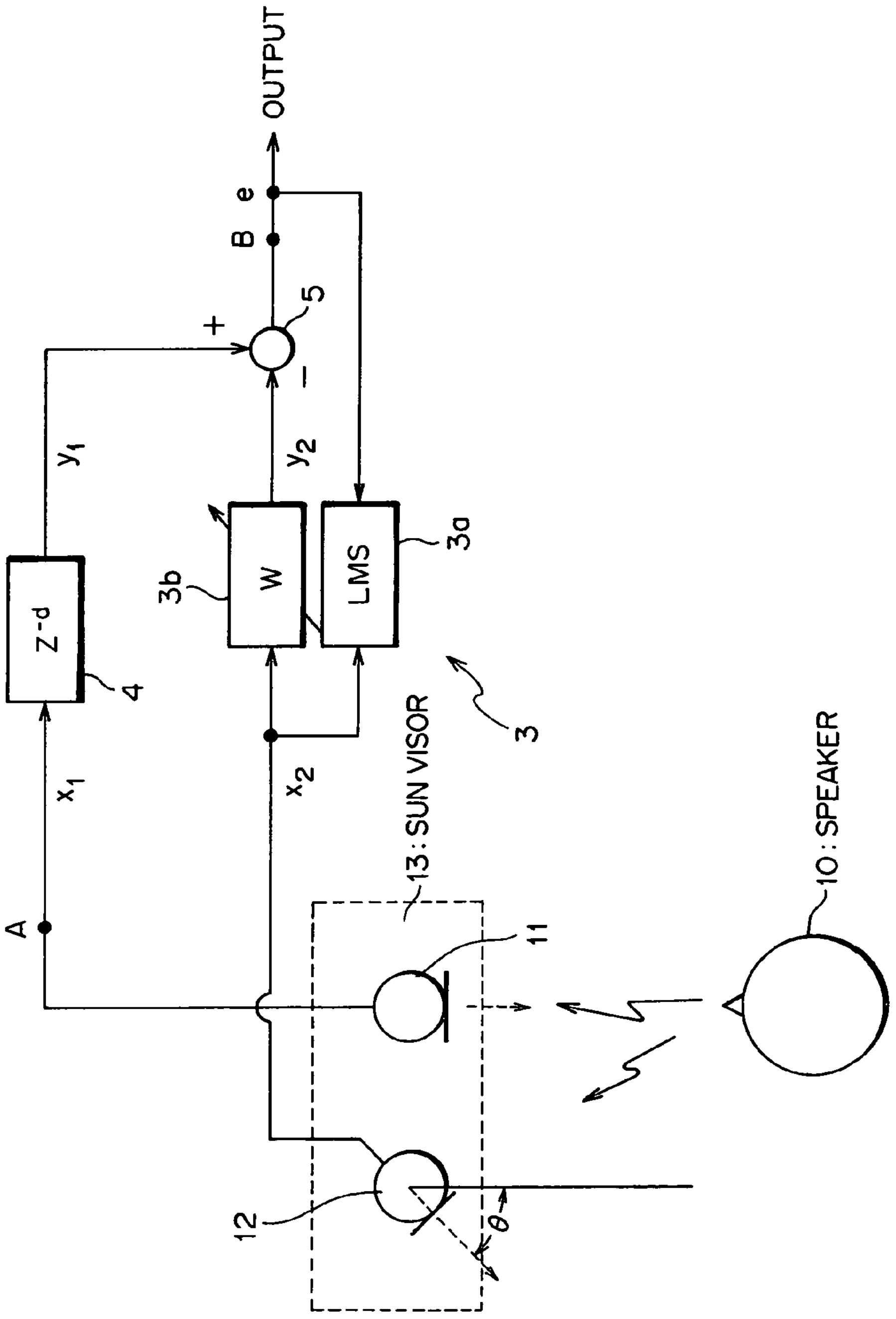
FIG. 1 is a block diagram of a microphone system relating to the first embodiment of the present invention.
Figure 2:
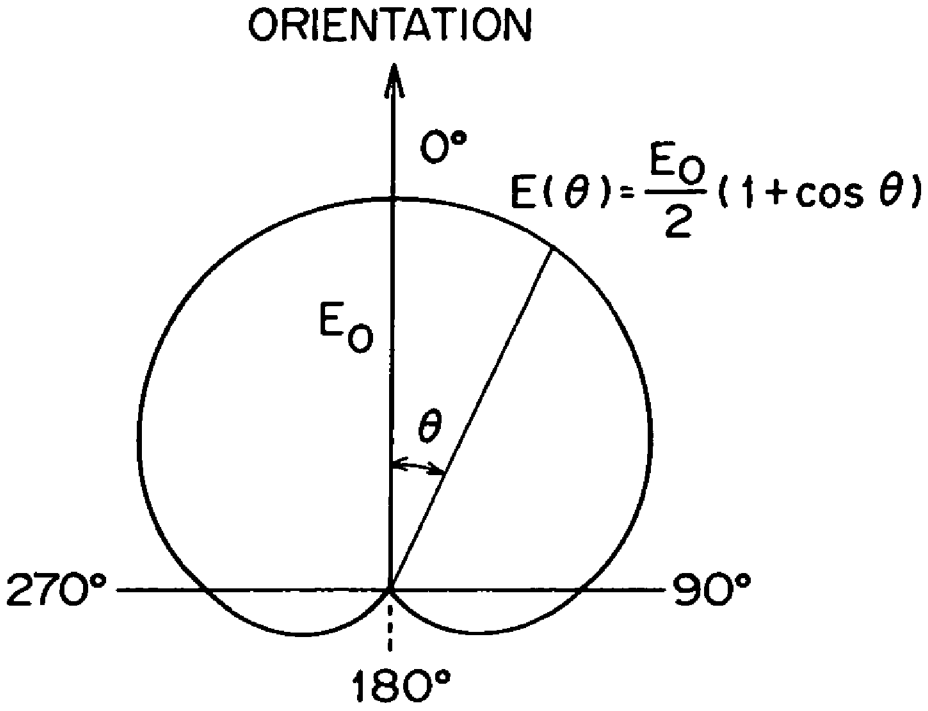
FIG. 2 is a chart explaining the directional characteristics.
Figure 17:
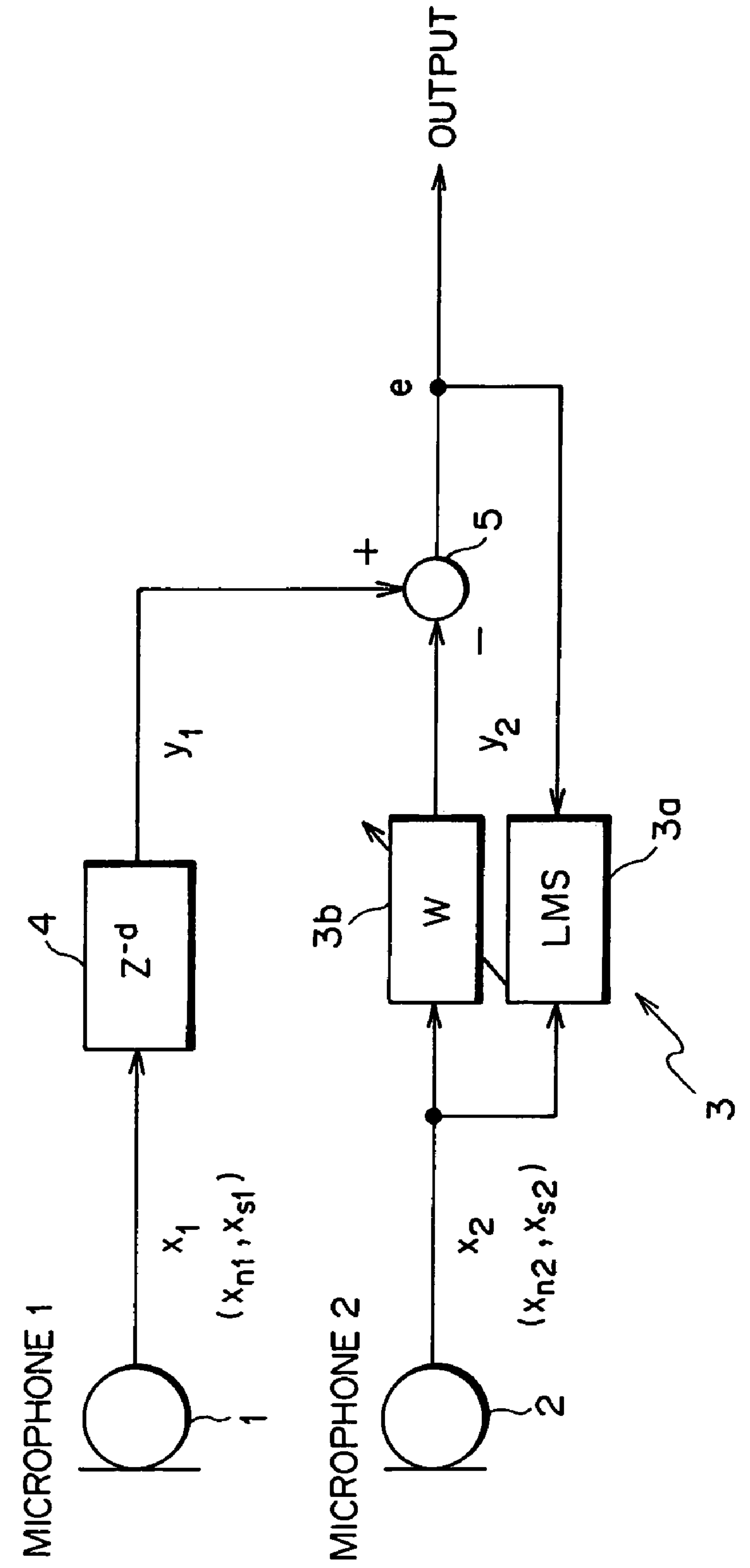
FIG. 17 PRIOR ART
FIG. 17 is a block diagram of a conventional high SN ratio voice reception system using two microphones.
Figure 18A:
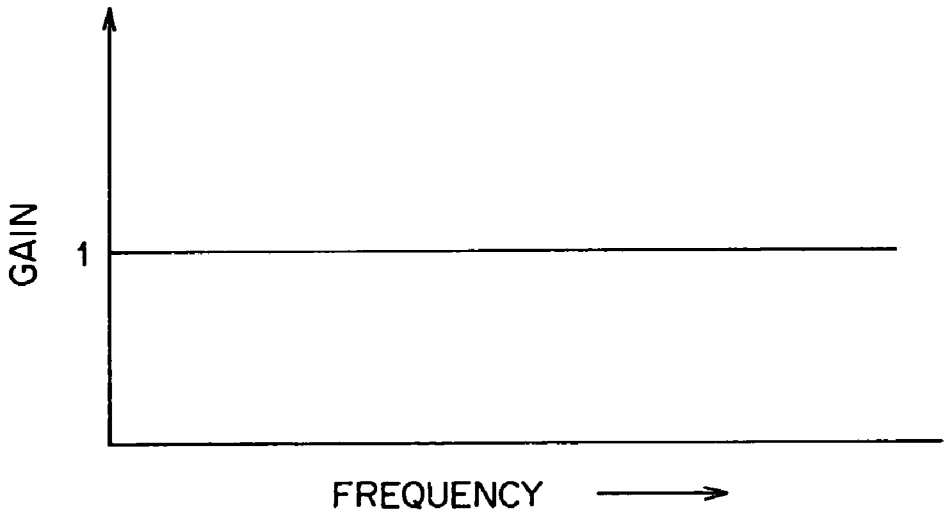
FIG. 18(a) PRIOR ART
FIG. 18 is a characteristics chart of the target response setter.
Figure 18B:
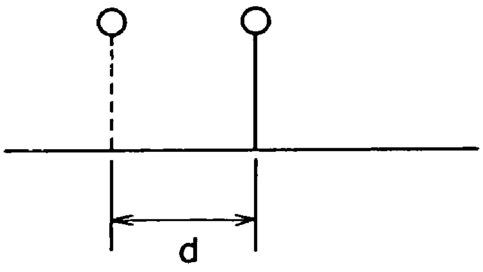
FIG. 18(b) PRIOR ART

FIG. 1 illustrates a configuration of the microphone system relating to the first embodiment of the invention, in which the same symbols are applied to the same components as in FIG. 17. In FIG. 1, 10 signifies a speaker, for example, a driver of a car, and 11, 12 signify first and second microphones having directional characteristics as to the voice reception sensitivity. The directional characteristics of the microphones have a unidirectional sensitivity characteristic, as shown in FIG. 2. That is, when the orientation is given by θ=0°, and the sensitivity at θ=0° is given by $E_0$, the sensitivity at an arbitrary angle θ is expressed by the following equation:

$$E(\theta)=E_0(1+\cos\theta)/2$$

and the sensitivity of the microphone decreases as the direction of the microphone deviates from the orientation θ=0°.

As an example, the first and second microphones 11, 12 in FIG. 1 are mounted on the sun visor 13 above the driver's seat at a distance of 10 cm. The orientation of the first microphone is set to coincide with the speaker's vocalizing direction (the direction to which the speaker's mouth faces), and the orientation of the second microphone faces toward the front passenger seat, which forms a specific angle θ relative to the speaker's vocalizing direction. Accordingly, from the directional characteristics in FIG. 2, the first microphone 11 has a high sensitivity to the speaker's voice and picks up the speaker's voice with a high SN ratio, and the second microphone 12 has a low sensitivity to the speaker's voice and picks up the speaker's voice with a low SN ratio.

3 signifies an adaptive signal processor which receives an error signal e and an output signal $X_2$ from the microphone 12 as the reference signal, and executes the adaptive signal processing on the basis of the LMS (Least Mean Square) algorithm so as to minimize the power of the error signal e. In the adaptive signal processor 3, 3*a* signifies an LMS calculator, 3*b* an adaptive filter with a configuration of the FIR type digital filter. The LMS calculator 3*a* determines the coefficients of the adaptive filter 3*b* so as to minimize the power of the error signal e by the adaptive signal processing. The adaptive signal processor 3 determines the coefficient W of the adaptive filter 3*b* only during the non-recognition of a voice, by the adaptive signal processing. During the recognition of a voice, the adaptive signal processor 3 does not update the filter coefficient, and sets the filter coefficient W determined during the non-recognition of a voice to the adaptive filter 3*b*.

4 signifies a target response setter that receives a signal outputted from the microphone 11 as the target signal, and has a delay characteristic of the time d and flat characteristics (characteristics of the gain 1) in the audio frequency band. 5 signifies a subtracter that subtracts the output signal of the adaptive filter 3*b* from a target response outputted from the target response setter 4, and outputs the error signal e.

According to the layout of the microphones in FIG. 1, owing to the voice emission characteristics of a human being (the characteristics in which the sound pressure when regarding a mouth of a human being as a sound source decreases as the measuring point deviates from the front of the speaker), in addition to the difference of the sensitivities of the first and second microphones 11, 12 to a speaker's voice, the voice powers when the two microphones 11, 12 receive a voice can be differentiated in spite of the adjacent layout of the microphones, and in addition, a high correlation of the noises that the two microphones 11, 12 receive can be maintained by the adjacent layout.

(b) Operation

During the non-recognition of a voice, when only noises are inputted to the microphones 11, 12, the adaptive signal processor 3 determines the filter coefficient W of the adaptive filter 3*b* so as to minimize the power of the error signal e by the adaptive signal processing. Ideally, the filter coefficient W(z) is reduced to the following.

$$W(z)=CN1\cdot z^{-d}/CN2 \tag{3}$$

On the other hand, during the recognition of a voice, the adaptive signal processor 3 does not update the filter coefficient, and sets the filter coefficient W(z) determined during the non-recognition of a voice to the adaptive filter 3*b* to output a voice signal. As the result, the voice signal is reduced to the following expression, from the expressions (2)' and (3).

$$Es(z) = (CS1\cdot z^{-d} - CS2\cdot w(z))\cdot xs = (CS1 - CS2\cdot CN1/CN2)\cdot z^{-d}\cdot xs \tag{4}$$

Provided that CN1≈CN2 is met by the adjacent layout of the microphones, the voice signal Es(z) of the expression (4) is given by the following expression:

$$Es(z)=(CS1-CS2)\cdot z^{-d}\cdot xs \tag{4'}$$

From the sensitivity difference of the microphones 11, 12 and the voice emission characteristics, CS1≠CS2 is given; accordingly, the voice signal Es(z) will not be reduced to zero. In other words, even when the adaptive filter coefficient W(z) is determined so as to minimize the power of the error signal e during the noise input, the voice signal Es(z) of the expression (4) is not reduced to zero, and the SN ratio of the voice signal can be improved. And, when CN1≈CN2 is met, the magnitude of the voice signal Es(z) depends mainly on the difference of (CS1−CS2), namely, the difference between the sensitivities of the microphones 11, 12.

(c) Examination of the Microphone Layout and the SN Ratio Improvement Rate

Thus, to improve the SN ratio, the fundamental philosophy is that, while receiving a noise having a correlation as high as possible two microphones, the voice should be received only by one microphone as much as possible. Based on this fundamental philosophy, the optimum microphone layout was examined. As the place where the microphones are mounted, (1) the sun visor of a car and (2) the ceiling above the front passenger seat of a car are selected.

(c-1) Layout of the Microphones

Figure 3A:
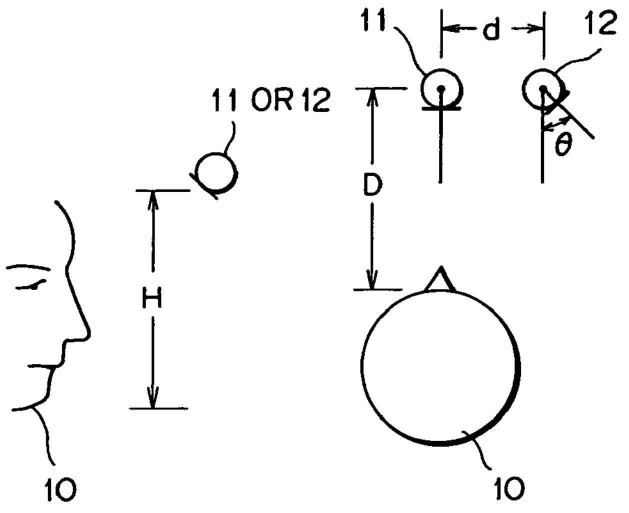
FIG. 3 is a chart explaining the layout of the microphones.
Figure 3B:
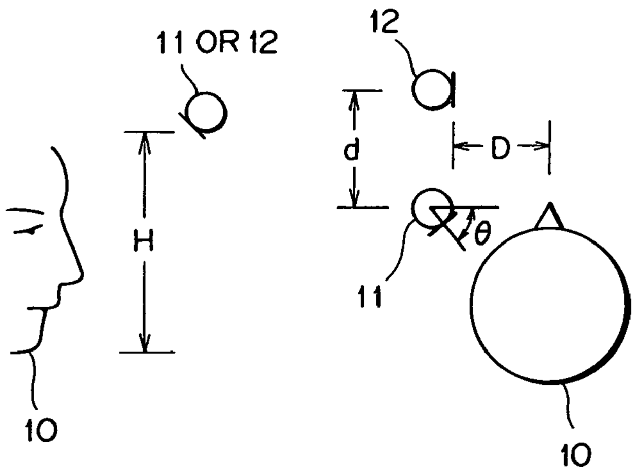

FIG. 3(*a*) illustrates a layout with the microphones mounted on the sun visor, in which the first and second microphones 11, 12 are spaced apart with a distance d on the sun visor (not illustrated) in front of the speaker 10, the orientation of the first microphone 11 is fixed to coincide with the speaker's vocalizing direction, and the orientation of the second microphone 12 is set with the angle θ against the speaker's vocalizing direction. The vertical distance H from the speaker's mouth to the microphones, and the horizontal distance D from the speaker's mouth to the microphones are constant, both of which are approximately 30 cm. In the examination of the SN ratio improvement rate, (1) the positions of the first and second microphones 11, 12 are fixed, and the orientation of the second microphone 12 is varied (refer to FIG. 4), and (2) the orientations of the first and second microphones 11, 12 are fixed, and the position of the second microphone 12 is moved to vary the distance between the microphones (refer to FIG. 5).

FIG. 3(*b*) illustrates a layout with the microphones mounted on the ceiling above the front passenger seat, in which the first and second microphones 11, 12 are spaced apart a distance d longitudinally on the ceiling above the driver's seat, and the orientations of the first and second microphones 11, 12 are set perpendicularly or with a specific angle θ to the speaker's vocalizing direction. The vertical distance H and horizontal distance D from the speaker's mouth to the microphones are constant, both of which are approximately 30 cm. In the examination of the SN ratio improvement rate, (3) the orientations of the first and second microphones 11, 12 are set perpendicularly to the speaker's vocalizing direction, and the position of the second microphone 12 is moved (refer to FIG. 6), and (4) the orientation of the first microphone 11 is fixed to form the angle θ with respect to the direction perpendicular to the speaker's vocalizing direction (set to face to the speaker's mouth), while the orientation of the second microphone 12 is set perpendicularly to the speaker's vocalizing direction, and the position of the second microphone is varied (refer to FIG. 7).

(c-2) Result of the Examination

FIG. 4 through FIG. 7 illustrate the cases in which the SN ratio improvement rate becomes maximum each in the foregoing cases (1) through (4). In these drawings, "Ps" denotes a voice power, "Pn" a noise power, "SNR" an SN ratio, "improvement rate" an SN ratio improvement rate (dB), and "NR rate" a noise reduction rate (dB). Further, "before NR" indicates the values Ps, Pn at point A in FIG. 1 without the noise reduction control applied, and "after NR" indicates the values Ps, Pn at point B in FIG. 1 with the noise reduction control applied. Also in the examination, for the cases in which the five place names "Hachinohe", "Kesennuma", "Yukuhashi", "Sapporo", "Kitami" were vocalized, Ps, Pn, SNR, "before NR" and "after NR" were acquired, and the SN ratio improvement rate was calculated from the SNR before and after NR, and the average of the SN ratio improvement rate was calculated in each of these cases.

(1) FIG. 4 shows an examination result when the positions of the first and second microphones 11, 12 are fixed on the sun visor, and the angle θ formed by the orientation of the second microphone 12 on the right and the speaker's vocalizing direction is varied. The examination was made as to the angle θ=15°, 30°, 45°, 60°, 90°, 120°, 180°, which obtained a maximum average SN ratio improvement rate of 4.3 dB at θ=45°.

Figures 5A, 5B:
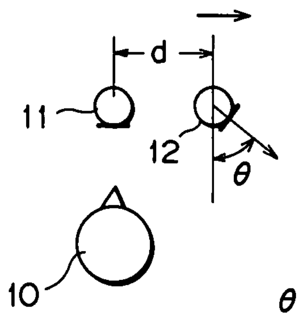
FIG. 5 is a table explaining the SN ratio improvement rate, when moving the microphone on the right side mounted on the sun visor, with the angle of 60°.

(2) FIG. 5 shows an examination result when the orientation of the first microphone 11 is fixed on the sun visor relative to the speaker's vocalizing direction, the orientation of the second microphone 12 is fixed to form the angle 60° with respect to the speaker's vocalizing direction, and the position of the second microphone 12 is moved to vary the distance d between the microphones. The examination was made as to the distance d=3 cm, 6 cm, 9 cm, 12 cm, 15 cm, 18 cm, which obtained a maximum average SN ratio improvement rate of 4.7 dB at d=9 cm.

(3) FIG. 6 shows an examination result when the orientations of the first and second microphones 11, 12 are set perpendicularly relative to the speaker's vocalizing direction, on the ceiling above the front passenger seat, and the position of the second microphone 12 is moved to vary the distance d between the microphones. The examination was made as to the distance d=2.5 cm, 5 cm, 7.5 cm, which obtained a maximum average SN ratio improvement rate of 4.5 dB at d=7.5 cm.

(4) FIG. 7 shows an examination result when the orientation of the first microphone 11 is fixed to form the angle θ with respect to the direction perpendicular to the speaker's vocalizing direction, on the ceiling above the driver's seat, the orientation of the second microphone 12 is set perpendicularly to the speaker's vocalizing direction, and the position of the second microphone is moved to vary the distance d between the microphones. The examination was made as to the distance d=2 cm, 4 cm, 6 cm, which obtained a maximum average SN ratio improvement rate of 4.5 dB at d=2 cm.

Thus, by adapting the microphone layouts as in the cases (1) through (4), the SN ratio can be improved about 4 to 5 dB. This improvement of the SN ratio will enhance the recognition rate to a great extent.

In FIG. 6 and FIG. 7, the microphones 11, 12 are mounted on the ceiling above the front passenger seat as an example, but can be mounted at similar positions on the ceiling above the driver's seat.

2. Second Embodiment (a) Configuration of the Microphone System

Figure 8:
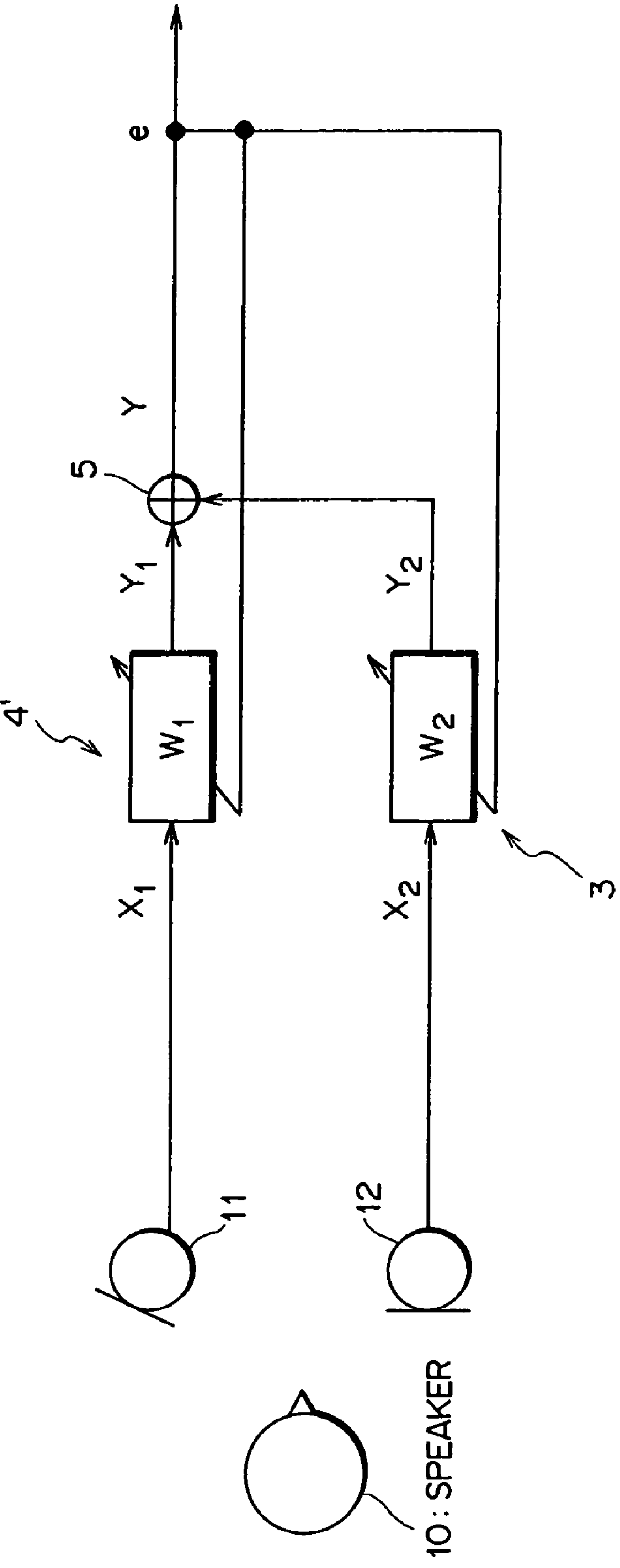
FIG. 8 is a block diagram of a microphone system relating to a second embodiment of the invention.

FIG. 8 illustrates another configuration of the microphone system relating to the second embodiment of the invention, in which the same symbols are applied to the same components as in FIG. 1. The difference lies in that the target response setter 4 in FIG. 1 is configured by an adaptive signal processor 4' in FIG. 8. In the microphone system in FIG. 1, only the adaptive signal processor 3 executes the adaptive signal processing to minimize the power of the error signal e; however in the microphone system in FIG. 8, the adaptive signal processor 3 and the adaptive signal processor 4' execute the adaptive signal processing to minimize the power of the error signal e.

3. Third Embodiment (a) Configuration of the Microphone System

Figure 9:
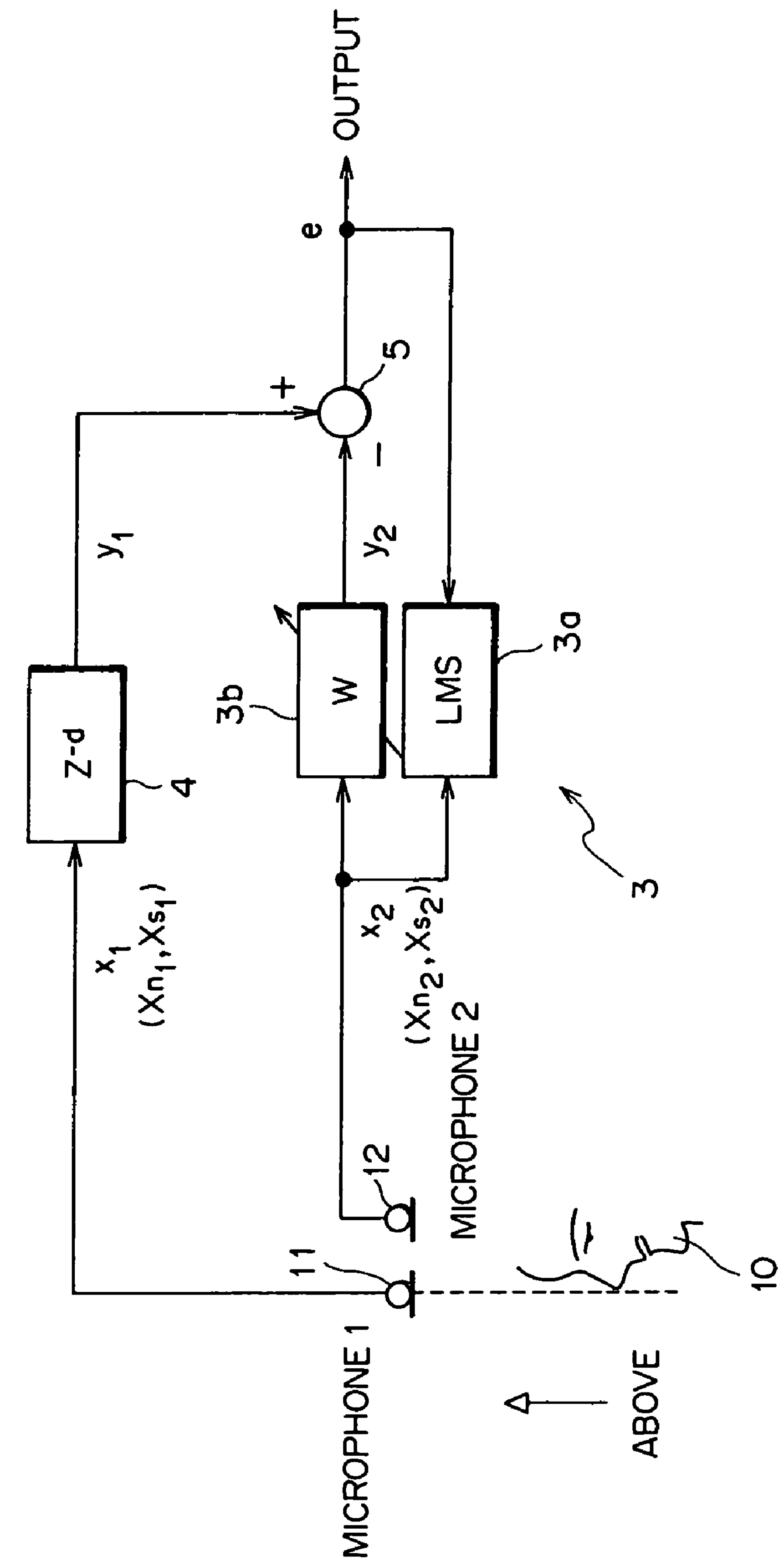
FIG. 9 is a block diagram of a microphone system relating to a third embodiment of the invention.

FIG. 9 illustrates another configuration of the microphone system relating to the third embodiment of the invention, in which the same symbols are applied to the same components as in FIG. 1. In the drawing, 10 signifies the driver of a car, and 11, 12 signify the first and second microphones. The first microphone 11 is installed on the ceiling right above the face of the speaker 10, and the second microphone 12 is installed on the ceiling on the occipital side about 1 to 5 cm from the first microphone position.

3 signifies an adaptive signal processor which receives an error signal e and an output signal $x_2$ from the microphone 12 as the reference signal, and executes the adaptive signal processing on the basis of the LMS (Least Mean Square) algorithm so as to minimize the power of the error signal e. In the adaptive signal processor 3, 3*a* signifies an LMS calculator, 3*b* an adaptive filter with a configuration of the FIR type digital filter. The LMS calculator 3*a* determines the coefficients of the adaptive filter 3*b* so as to minimize the power of the error signal e by the adaptive signal processing. The adaptive signal processor 3 determines the coefficient W of the adaptive filter 3*b* only during the non-recognition of a voice, by the adaptive signal processing; and during the recognition of a voice, the adaptive signal processor 3 does not update the filter coefficient, and sets the filter coefficient W determined during the non-recognition of a voice to the adaptive filter 3*b*.

4 signifies a target response setter that receives a signal outputted from the microphone 11 as the target signal, and has a delay characteristic of the time d and flat characteristics (characteristics of the gain 1) in the audio frequency band. 5 signifies a subtracter that subtracts the output signal of the adaptive filter 3*b* from a target response signal outputted from the target response setter 4, and outputs the error signal e.

(b) Voice Emission Characteristics of a Human Being

Figure 10A:
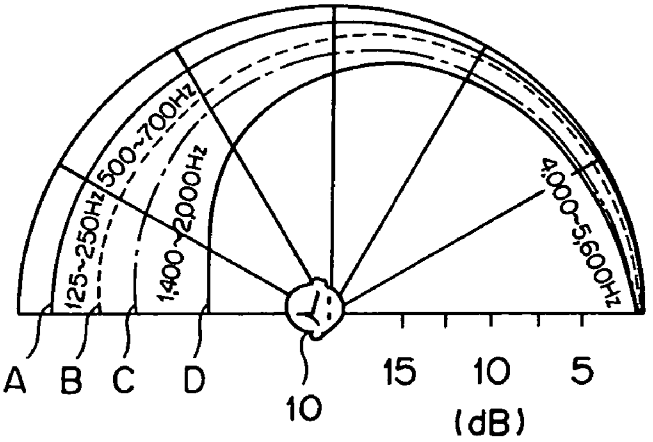
FIG. 10 is an illustration of the voice emission characteristics of a human being.
Figure 10B:
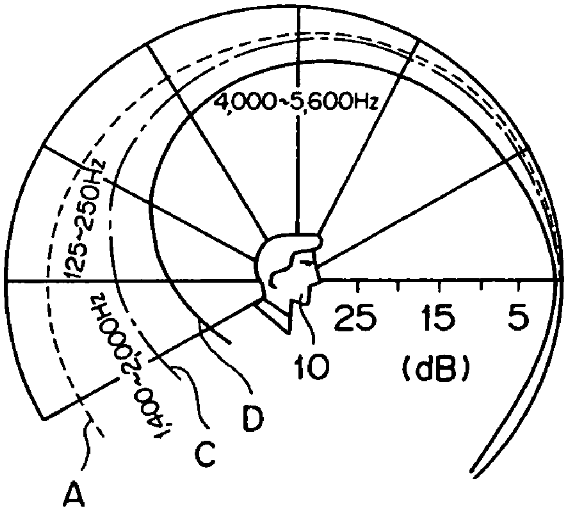

FIG. 10 illustrates the voice emission characteristics of a human being. FIG. 10(*a*) is an emission characteristics chart that illustrates the voice level at a position of a specific distance from the speaker's mouth on the horizontal plane including the speaker's mouth, with regard to some representative frequencies. FIG. 10(*b*) is an emission characteristics chart that illustrates the voice level at a position of a specific distance from the speaker's mouth on the vertical plane including the speaker's mouth, with regard to the same frequencies as above. In the drawing, A represents 125 Hz–250 Hz, B represents 500 Hz–700 Hz, C represents 1400 Hz–2000 Hz, and D represents 4000 Hz–5600 Hz. As clearly illustrated in these emission characteristics charts, a human vocalized voice is emitted most strongly into the front direction of the speaker, and the power of the voice emitted upward, downward, or right and left is weaker, compared to the front direction of the speaker.

Therefore, if the first microphone 11 is disposed on the ceiling right above the face of the speaker 10, and the second microphone 12 is disposed on the ceiling on the occipital side by about 1 to 5 cm from the first microphone position, as shown in FIG. 9, (1) the powers of the noise received by the two microphones 11, 12 will substantially be equal, but on the other hand (2) the powers of the voice received by the two microphones 11, 12 will be differentiated. That is, the noises $Xn_1(z)$, $Xn_2(z)$ contained in the output signals of the two microphones 11, 12 can be made almost equal, and the voice signals $Xs_1(z)$, $Xs_2(z)$ contained in the output signals of the two microphones 11, 12 can be differentiated, whereby the relation: $[Xn_1(z)/Xn_2(z)] \neq [Xs_1(z)/Xs_2(z)]$ can be achieved.

(c) Operation

During the non-recognition of a voice when only the noise is inputted to the microphones 11, 12, the adaptive signal processor 3 determines the filter coefficient W of the adaptive filter 3*b* to minimize the average of $\{En(z)\}^2$ in the expression:

$$En(z)=Xn_1(z)z^{-d}-Xn_2(z)\cdot W(z) \quad (1)$$

On the other hand, during the recognition of a voice, the adaptive signal processor 3 does not update the filter coefficient, and sets the filter coefficient W determined during the non-recognition of a voice to the adaptive filter 3*b* to output a voice signal. Here, the voice signals $Xs_1(z)$, $Xs_2(z)$ contained in the output signals of the microphones 11, 12 are different, and accordingly $[Xn_1(z)/Xn_2(z)] \neq [Xs_1(z)/Xs_2(z)]$ is satisfied. Therefore, the voice output Es(z) given by the following expression (2) does not become minimum (does not become diminished very much, compared to the noise).

$$Es(z)=Xs_1(z)z^{-d}-Xs_2(z)\cdot W(z) \quad (2)$$

Thus, when the adaptive filter coefficient W is determined to zero the power of the noise output En(z) given by the expression (1), the voice output Es(z) given by the expression (2) does not become as diminished as the noise, and the SN ratio of the voice signal can be improved accordingly.

To summarize the above explanations, the relatively close disposition of the microphones 11, 12 as shown in FIG. 9 restricts the lowering of the coherence of the noises outputted from the two microphones. Further, the relatively close disposition of the microphones 11, 12 in which the voice emission characteristics of a human being as shown in FIG. 10 are taken into consideration allows the one microphone 11 to pick up a voice with as high an SN ratio as possible, and the other microphone 12 to pick up the voice with as low an SN ratio as possible. Consequently, the determination of the adaptive filter coefficient W such that the noise output becomes zero will not lower the voice output the same as the noise, and improves the SN ratio of the voice signal.

(d) Examination of the Microphone position and the SN Ratio Improvement Rate

The emission characteristics in FIG. 10 reveals that the voice emission by a human vocalization into a space attenuates remarkably sharply on the occipital side, and diminishes the level in comparison to the voice emitted toward the front. Therefore, in the microphone system of this embodiment, it is fundamental that the microphones are disposed from right above the head of a human being to the occipital side thereof, as shown in FIG. 9. The installation of the first and second microphones 11, 12 in this manner will significantly improve the SN ratio.

Figure 11:
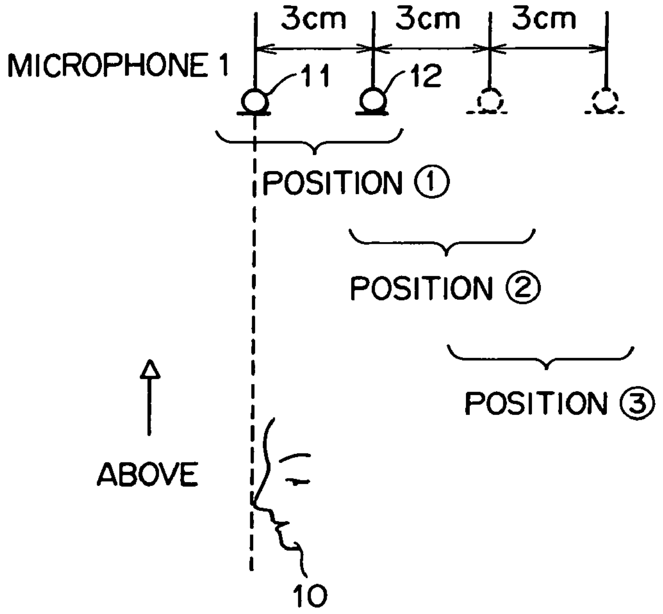
FIG. 11 is a chart explaining the positions of the paired microphones.
Figure 12:
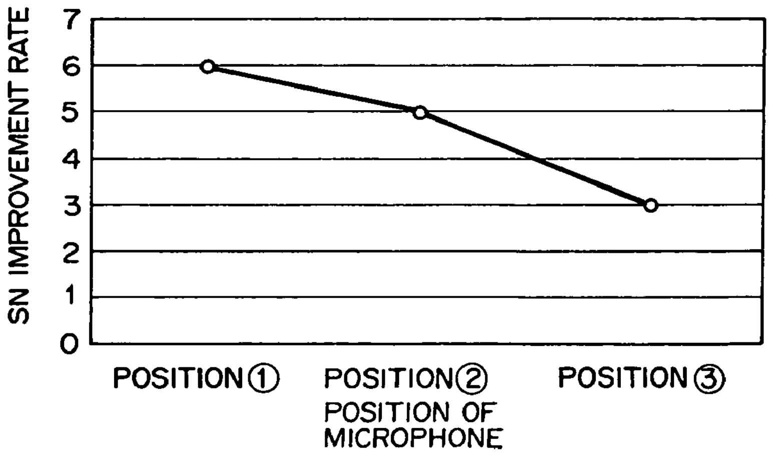
FIG. 12 is an illustration of the relationship between the positions of the paired microphones and the SN ratio improvement rate.

FIG. 11 is a chart explaining the positions of the paired microphones, and FIG. 12 illustrates the SN ratio improvement rate at the positions of the paired microphones shown in FIG. 11. As shown in FIG. 11, the paired microphones 11, 12 with a constant spacing of 3 cm were installed at plural positions 1, 2, 3, and the SN ratio improvement rate at each position was investigated with a 1500 cc sedan, which yielded the results shown in FIG. 12. FIG. 12 confirms that the installation of the paired microphones 11, 12 at the position 1, namely, the installation of one microphone almost right above the face of the speaker 10 and the installation of the other microphone on the occipital side a little apart therefrom, maximizes the SN ratio improvement rate.

Figure 13:
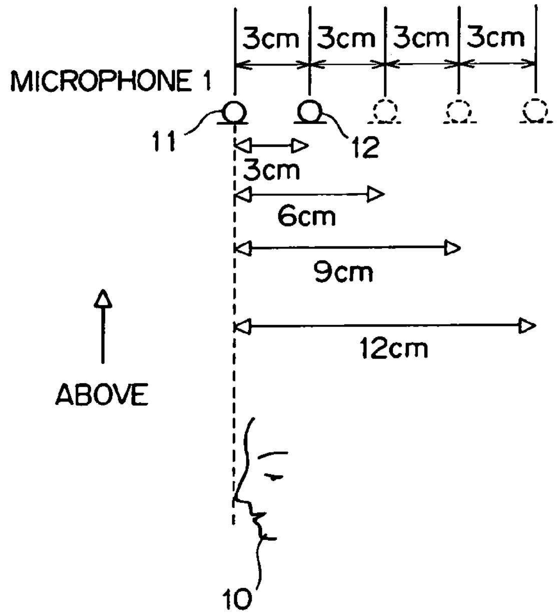
FIG. 13 is a chart explaining the distance between the paired microphones.
Figure 14:
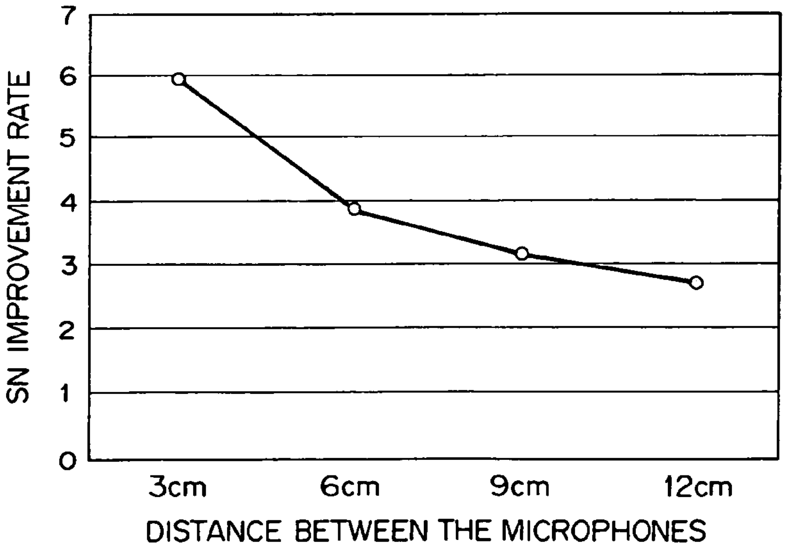
FIG. 14 is an illustration of the relationship between the distance between the paired microphones and the SN ratio improvement rate.

FIG. 13 is a chart explaining the distance between the paired microphones, and FIG. 14 illustrates the SN ratio improvement rate in the distance between the paired microphones shown in FIG. 13. As shown in FIG. 13, the first microphone 11 was fixed almost right above the face of the speaker 10, and the second microphone 12 was spaced apart on the occipital side by 3 cm, 6 cm, 9 cm, 12 cm each from the first microphone 11. The optimum distance between the microphones was investigated, which yielded the results shown in FIG. 14. From FIG. 14, it can be seen that the SN ratio improvement rate increases as the distance between the two microphones becomes smaller. However, in the system shown in FIG. 9, to set the distance to 0 cm will completely eliminate the noise, but it will also eliminate the voice. Accordingly, it would not work as a voice reception system. On the other hand, even a small-type microphone possesses a certain size itself, and even if two such microphones are completely joined together, the distance between the centers of the two microphones will not be shorter than about 1 cm. Therefore, the distance between the microphones should be set to about 1 cm to 5 cm, although there are slight latitudes depending on the difference in the type of car or on the size of microphones.

Figure 15:
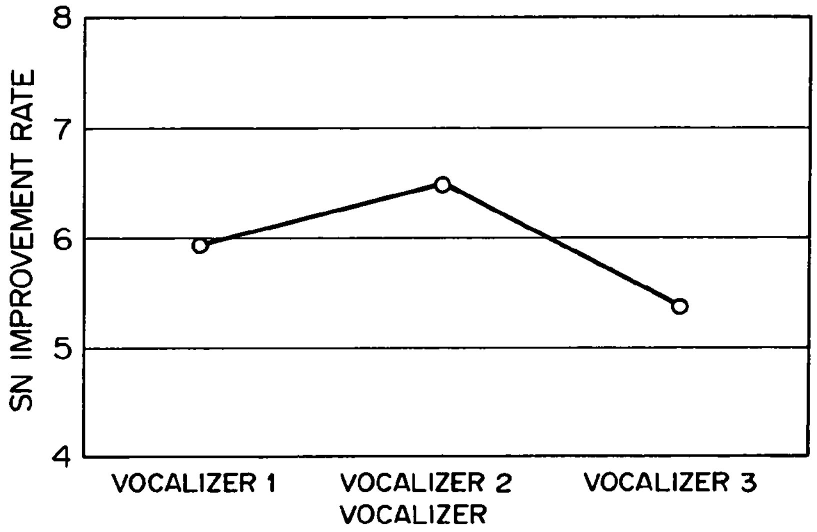
FIG. 15 is a chart explaining the SN ratio improvement rate by each vocalizer.
Figure 16:
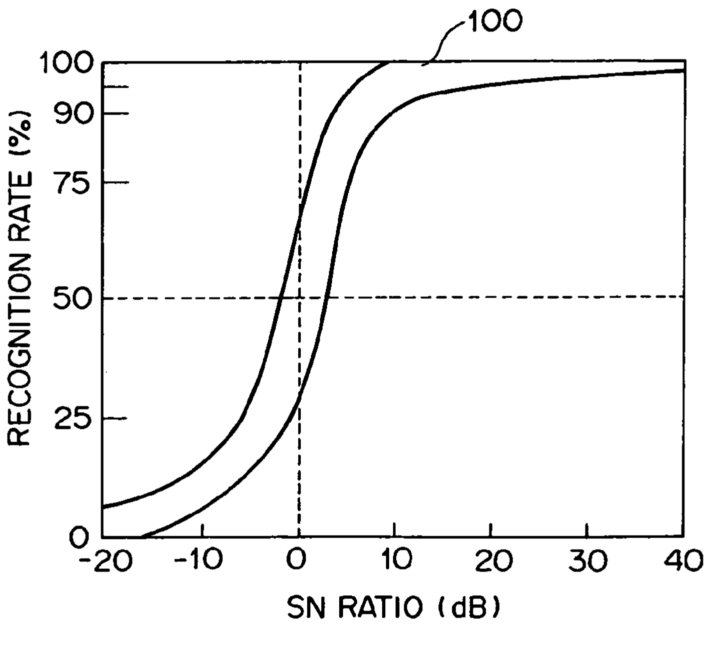
FIG. 16 PRIOR ART
FIG. 16 is an illustration of the relationship between the SN ratio and the recognition rate.

FIG. 15 is a chart explaining the SN ratio improvement rate by each vocalizer. As is clear from FIG. 15, in the microphone system of the invention, the performance (SN ratio improvement rate) dispersion depending on the user is about 1 dB, and therefore the influence due to different speakers is limited.

Although the embodiment in which the two microphones are positioned above the head of the speaker has been explained, if one microphone can pick up a voice with as high an SN ratio as possible, and the other microphone can pick up the voice with as low an SN ratio as possible in the condition of a relatively adjacent disposition of the two microphones, the positioning is not limited to "above the head".

Thus, according to the invention, since the two microphones having directional characteristics are positioned adjacently, and in addition the angles formed by the orientations of the microphones relative to the speaker's vocalizing direction are different for each microphone, the SN ratio of a voice signal outputted from one microphone can be raised, and the SN ratio of the voice signal outputted from the other microphone can be lowered. Consequently, if the adaptive filter coefficient is determined to minimize the noise output, the voice signal output will not become zero, which improves the SN ratio of the voice signal.

Further, according to the invention, with a simplified configuration such that the microphones are mounted on the sun visor of a car, or on the ceiling above the front passenger seat or the driver's seat, and the orientations of the microphones are different, in spite of the relatively adjacent positioning of the microphones, one microphone can pick up a voice with as high an SN ratio as possible, and the other microphone can pick up the voice with as low an SN ratio as possible, thus improving the SN ratio.

Further, according to the invention, since the two microphones are laid out adjacently, and the SN ratio of a voice signal outputted from one microphone is raised while the SN ratio of the voice signal outputted from the other microphone is lowered, if the adaptive filter coefficient is determined to minimize the noise output, the voice signal output will not become zero, which improves the SN ratio of the voice signal. In other words, in spite of the limited number of microphones, the microphone system is able to receive and output the voice signal with a high SN ratio.

Also, according to the invention, with the layout of one microphone on the ceiling right above the face of the speaker and the layout of the other microphone on the ceiling on the occipital side by about 1 to 5 cm from the position of the first microphone, in spite of the relatively adjacent layout of the microphones, the first microphone can pick up a voice with as high an SN ratio as possible, and the other microphone can pick up the voice with as low an SN ratio as possible.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A microphone system that executes an adaptive signal processing by using output signals from two microphones and outputs a speaker's voice signal with an improved SN ratio, the microphone system comprising two microphones having directional characteristics, wherein the microphones are positioned relatively close to one another, both microphones are positioned in front of and above the position of the speaker's mouth by approximately the same distance, and the angles formed by the orientations of the microphones with respect to a speaker's vocalizing direction are different for each of the microphones, wherein the angle formed by the orientation of a first microphone with respect to the speaker's vocalizing direction is set to approximately 0°, and the angle formed by the orientation of a second microphone with respect to the speaker's vocalizing direction is set to approximately 45°;

wherein a signal from the first microphone is supplied through a target response setter having a delay characteristic to a subtracter; a signal from the second microphone is supplied through an adaptive filter to the subtracter; and the output of the subtracter produces a difference signal that is supplied to the adaptive filter which executes adaptive signal processing on the basis of the LMS (Least Mean Square) algorithm so as to minimize the power of the difference signal.

2. A microphone system as claimed in claim 1, wherein the microphones are mounted on the sun visor of a vehicle.

3. A microphone system as claimed in claim 1, wherein the microphones are mounted on the ceiling above the driver's seat of a vehicle.

4. A microphone system as claimed in claim 1, wherein the microphones are mounted on the ceiling above the front passenger seat of a vehicle.

5. A microphone system as claimed in claim 1, wherein the distance between the two microphones is about 9 cm.

6. A microphone system that outputs a speaker's voice signal with an improved SN ratio, comprising two microphones having directional characteristics, wherein the two microphones are spaced apart approximately 9 cm, both microphones are positioned in front of and above the position of a speaker's mouth by approximately the same distance, and angles formed by the orientations of the microphones with respect to a speaker's vocalizing direction are different for each of the microphones, wherein the angle formed by the orientation of a first microphone with respect to the speaker's vocalizing direction is set to approximately 0°, and the angle formed by the orientation of a second microphone with respect to the speaker's vocalizing direction is set to approximately 60°;

wherein a signal from the first microphone is supplied through a target response setter having a delay characteristic to a subtracter; a signal from the second microphone is supplied through an adaptive filter to the subtracter; and the output of the subtracter produces a difference signal that is supplied to the adaptive filter which executes adaptive signal processing on the basis of the LMS (Least Mean Square) algorithm so as to minimize the power of the difference signal.

7. A microphone system as claimed in claim 6, wherein the microphones are mounted on the sun visor of a vehicle.

8. A microphone system as claimed in claim 6, further comprising a filter processing means that updates filter coefficients of the adaptive filter.

9. A microphone system that executes an adaptive signal processing by using output signals from two microphones and outputs a speaker's voice signal with an improved SN ratio, wherein the microphones have directional characteristics and are positioned close to one another, and the SN ratio of the output signal from one microphone is raised, while the SN ratio of the output signal from the other microphone is lowered;

wherein a first adaptive signal processor receives an output signal from one microphone and an error signal and provides an output signal to a subtracter, a second adaptive signal processor receives an output signal from the other microphone and said error signal and provides an output signal to said subtracter, and the subtracter outputs said error signal as a difference between said output signals, the first and second adaptive signal processors executing adaptive signal processing on the basis of the LMS (Least Mean Square) algorithm so as to minimize the power of said error signal.

10. A microphone system as claimed in claim 9, wherein one microphone is disposed almost directly above the face of a speaker and both microphones are positioned at about the same height above a speaker's mouth.

11. A microphone system as claimed in claim 10, wherein the other microphone is spaced apart on the occipital side from the position of the one microphone.

12. A microphone system as claimed in claim 10, wherein the other microphone is spaced apart on the occipital side by about 1 to 5 cm from the position of the one microphone.

13. A microphone system that executes an adaptive signal processing by using output signals from two microphones and outputs a speaker's voice signal with an improved SN ratio, the system comprising two directional microphones, wherein both of said microphones are positioned above and to one side of the position of a speaker's mouth by approximately the same distance, are oriented substantially perpendicularly to the speaker's vocalizing direction, and are spaced apart from one another in the vocalizing direction by approximately 7.5 cm with a first microphone being positioned closer to the speaker than a second microphone;

wherein a signal from the first microphone is supplied through a target response setter having a delay characteristic to a subtracter; a signal from the second microphone is supplied through an adaptive filter to the subtracter; and the output of the subtracter produces a difference signal that is supplied to the adaptive filter which executes adaptive signal processing on the basis of the LMS (Least Mean Square) algorithm so as to minimize the power of the difference signal.

14. A microphone system as claimed in claim 13, wherein the microphones are mounted on the sun visor of a vehicle.

15. A microphone system as claimed in claim 13, wherein the microphones are mounted on the ceiling above the driver's seat of a vehicle.

16. A microphone system as claimed in claim 13, wherein the microphones are mounted on the ceiling above the front passenger seat of a vehicle.

17. A microphone system that executes an adaptive signal processing by using output signals from two microphones and outputs a speaker's voice signal with an improved SN ratio, the system comprising two directional microphones, wherein both of said microphones are positioned above and to one side of the position of a speaker's mouth by approximately the same distance, a first microphone is oriented to an acute angle relative to a direction perpendicular to the speaker's vocalizing direction, a second microphone is oriented substantially perpendicularly to the speaker's vocalizing direction, and the microphones are spaced apart from one another in the vocalizing direction by about 2 cm with the first microphone being positioned closer to the speaker than a second microphone;

wherein a signal from the first microphone is supplied through a target response setter having a delay characteristic to a subtracter; a signal from the second microphone is supplied through an adaptive filter to the subtracter; and the output of the subtracter produces a difference signal that is supplied to the adaptive filter which executes adaptive signal processing on the basis of the LMS (Least Mean Square) algorithm so as to minimize the power of the difference signal.

18. A microphone system as claimed in claim 17, wherein the microphones are mounted on the sun visor of a vehicle.

19. A microphone system as claimed in claim 17, wherein the microphones are mounted on the ceiling above the driver's seat of a vehicle.

20. A microphone system as claimed in claim 17, wherein the microphones are mounted on the ceiling above the front passenger seat of a vehicle.

* * * * *